(12) United States Patent
Chen et al.

(10) Patent No.: US 7,474,710 B2
(45) Date of Patent: Jan. 6, 2009

(54) AMPLITUDE AND PHASE MATCHING FOR LAYERED MODULATION RECEPTION

(75) Inventors: Ernest C. Chen, San Pedro, CA (US); Jeng-Hong Chen, Temple City, CA (US); Kenneth Shum, Monterey Park, CA (US); Joungheon Oh, Los Angeles, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 527 days.

(21) Appl. No.: 10/532,524

(22) PCT Filed: Oct. 3, 2003

(86) PCT No.: PCT/US03/31199

§ 371 (c)(1),
(2), (4) Date: Apr. 25, 2005

(87) PCT Pub. No.: WO2004/040806

PCT Pub. Date: May 13, 2004

(65) Prior Publication Data

US 2006/0018406 A1      Jan. 26, 2006

Related U.S. Application Data

(60) Provisional application No. 60/421,332, filed on Oct. 25, 2002.

(51) Int. Cl.
*H03K 9/00* (2006.01)
(52) U.S. Cl. .................. 375/316; 375/316; 375/340
(58) Field of Classification Search .................. 375/316, 375/340, 341, 324
See application file for complete search history.

(56) References Cited

U.S. PATENT DOCUMENTS

| 3,076,180 | A | 1/1963 | Havens et al. |
| 3,383,598 | A | 5/1968 | Sanders |
| 3,878,468 | A | 4/1975 | Falconer et al. |

(Continued)

FOREIGN PATENT DOCUMENTS

DE         3642213         12/1986

(Continued)

OTHER PUBLICATIONS

Scott, R. P. et al.; Ultralow Phase Noise Ti:sapphire Laser Rivals 100 MHz Crystal Oscillator; Nov. 11-15, 2001; IEEE-Leos; pp. 1-2.

(Continued)

*Primary Examiner*—Emmanuel Bayard

(57) ABSTRACT

An apparatus and method for receiving layered modulation signals is disclosed. A typical method includes receiving a layered modulation signal including an upper layer signal and a lower layer signal, demodulating and decoding the upper layer signal from the received layered modulation signal, estimating an upper layer amplitude factor and an upper layer phase factor from the received layered modulation signal. A substantially ideal upper layer signal is reconstructed from the demodulated and decoded upper layer signal including matching an ideal amplitude and an ideal phase by applying the upper layer amplitude factor and the upper layer phase factor to the reconstructed ideal upper layer signal. Finally, the reconstructed ideal upper layer signal is subtracted from the received layered modulation signal to produce the lower layer signal for processing.

28 Claims, 7 Drawing Sheets

U.S. PATENT DOCUMENTS

| | | |
|---|---|---|
| 3,879,664 A | 4/1975 | Monsen |
| 3,974,449 A | 8/1976 | Falconer |
| 4,039,961 A | 8/1977 | Ishio et al. |
| 4,068,186 A | 1/1978 | Sato et al. |
| 4,213,095 A | 7/1980 | Falconer |
| 4,253,184 A | 2/1981 | Gitlin et al. |
| 4,283,684 A | 8/1981 | Satoh |
| 4,384,355 A | 5/1983 | Werner |
| RE31,351 E | 8/1983 | Falconer |
| 4,416,015 A | 11/1983 | Gitlin |
| 4,422,175 A | 12/1983 | Bingham et al. |
| 4,484,337 A | 11/1984 | Leclert et al. |
| 4,500,984 A | 2/1985 | Shimbo et al. |
| 4,519,084 A | 5/1985 | Langseth |
| 4,594,725 A | 6/1986 | Desperben et al. |
| 4,628,507 A | 12/1986 | Otani |
| 4,637,017 A | 1/1987 | Assal et al. |
| 4,647,873 A | 3/1987 | Beckner et al. |
| 4,654,863 A | 3/1987 | Belfield et al. |
| 4,670,789 A | 6/1987 | Plume |
| 4,709,374 A | 11/1987 | Farrow |
| 4,800,573 A | 1/1989 | Cupo |
| 4,829,543 A | 5/1989 | Borth et al. |
| 4,835,790 A | 5/1989 | Yoshida et al. |
| 4,847,864 A | 7/1989 | Cupo |
| 4,860,315 A | 8/1989 | Hosoda et al. |
| 4,878,030 A | 10/1989 | Vincze |
| 4,896,369 A | 1/1990 | Adams et al. |
| 4,918,708 A | 4/1990 | Pottinger et al. |
| 4,993,047 A | 2/1991 | Moffat et al. |
| 5,043,734 A | 8/1991 | Niho |
| 5,088,110 A | 2/1992 | Bonnerot et al. |
| 5,111,155 A | 5/1992 | Keate et al. |
| 5,121,414 A | 6/1992 | Levine et al. |
| 5,199,047 A | 3/1993 | Koch |
| 5,206,889 A | 4/1993 | Unkrich |
| 5,221,908 A | 6/1993 | Katz et al. |
| 5,229,765 A | 7/1993 | Gardner |
| 5,233,632 A | 8/1993 | Baum et al. |
| 5,237,292 A | 8/1993 | Chethik |
| 5,285,474 A | 2/1994 | Chow et al. |
| 5,285,480 A | 2/1994 | Chennakeshu et al. |
| 5,317,599 A | 5/1994 | Obata |
| 5,329,311 A | 7/1994 | Ward et al. |
| 5,337,014 A | 8/1994 | Najle et al. |
| 5,353,307 A | 10/1994 | Lester et al. |
| 5,412,325 A | 5/1995 | Meyers |
| 5,430,770 A | 7/1995 | Abbey |
| 5,450,623 A | 9/1995 | Yokoyama et al. |
| 5,467,197 A | 11/1995 | Hoff |
| 5,471,508 A | 11/1995 | Koslov |
| 5,493,307 A | 2/1996 | Tsujimoto |
| 5,513,215 A | 4/1996 | Marchetto et al. |
| 5,555,257 A | 9/1996 | Dent |
| 5,577,067 A | 11/1996 | Zimmerman |
| 5,577,087 A | 11/1996 | Furuya |
| 5,579,344 A | 11/1996 | Namekata |
| 5,581,229 A | 12/1996 | Hunt |
| 5,592,481 A | 1/1997 | Wiedeman et al. |
| 5,602,868 A | 2/1997 | Wilson |
| 5,603,084 A | 2/1997 | Henry et al. |
| 5,606,286 A | 2/1997 | Bains |
| 5,608,331 A | 3/1997 | Newberg et al. |
| 5,625,640 A | 4/1997 | Palmer et al. |
| 5,642,358 A | 6/1997 | Dent |
| 5,644,592 A | 7/1997 | Divsalar et al. |
| 5,648,955 A | 7/1997 | Jensen et al. |
| 5,732,113 A | 3/1998 | Schmidl et al. |
| 5,793,818 A | 8/1998 | Claydon et al. |
| 5,815,531 A | 9/1998 | Dent |
| 5,819,157 A | 10/1998 | Ben-Efraim et al. |
| 5,828,710 A | 10/1998 | Beale |
| 5,848,060 A | 12/1998 | Dent |
| 5,870,439 A | 2/1999 | Ben-Efraim et al. |
| 5,870,443 A | 2/1999 | Rahnema |
| 5,937,004 A | 8/1999 | Fasulo et al. |
| 5,940,025 A | 8/1999 | Koehnke et al. |
| 5,940,750 A | 8/1999 | Wang |
| 5,946,625 A | 8/1999 | Hassan et al. |
| 5,952,834 A | 9/1999 | Buckley |
| 5,956,373 A | 9/1999 | Goldston et al. |
| 5,960,040 A | 9/1999 | Cai et al. |
| 5,963,845 A | 10/1999 | Floury et al. |
| 5,966,048 A | 10/1999 | Thompson |
| 5,966,186 A | 10/1999 | Shigihara et al. |
| 5,966,412 A | 10/1999 | Ramaswamy |
| 5,970,098 A | 10/1999 | Herzberg |
| 5,970,156 A | 10/1999 | Hummelgaard et al. |
| 5,970,429 A | 10/1999 | Martin |
| 5,978,652 A | 11/1999 | Burr et al. |
| 5,987,068 A | 11/1999 | Cassia et al. |
| 5,987,069 A | 11/1999 | Furukawa et al. |
| 5,995,832 A | 11/1999 | Mallinckrodt |
| 5,999,793 A | 12/1999 | Ben-Efraim et al. |
| 6,002,713 A | 12/1999 | Goldstein et al. |
| 6,008,692 A | 12/1999 | Escartin |
| 6,018,556 A | 1/2000 | Janesch et al. |
| 6,021,159 A | 2/2000 | Nakagawa |
| 6,028,894 A | 2/2000 | Oishi et al. |
| 6,032,026 A | 2/2000 | Seki et al. |
| 6,034,952 A | 3/2000 | Dohi et al. |
| 6,049,566 A | 4/2000 | Saunders et al. |
| 6,052,586 A | 4/2000 | Karabinis |
| 6,055,278 A | 4/2000 | Ho et al. |
| 6,061,393 A | 5/2000 | Tsui et al. |
| 6,072,841 A | 6/2000 | Rahnema |
| 6,078,645 A | 6/2000 | Cai et al. |
| 6,084,919 A | 7/2000 | Kleider et al. |
| 6,104,747 A | 8/2000 | Jalloul et al. |
| 6,108,374 A | 8/2000 | Balachandran et al. |
| 6,125,148 A | 9/2000 | Frodigh et al. |
| 6,125,260 A | 9/2000 | Wiedeman et al. |
| 6,128,357 A | 10/2000 | Lu et al. |
| 6,131,013 A | 10/2000 | Bergstrom et al. |
| 6,134,282 A | 10/2000 | Ben-Efraim et al. |
| 6,140,809 A | 10/2000 | Doi |
| 6,141,534 A | 10/2000 | Snell et al. |
| 6,144,708 A | 11/2000 | Maruyama |
| 6,166,601 A | 12/2000 | Shalom et al. |
| 6,177,836 B1 | 1/2001 | Young et al. |
| 6,178,158 B1 | 1/2001 | Suzuki et al. |
| 6,188,717 B1 | 2/2001 | Kaiser et al. |
| 6,192,088 B1 | 2/2001 | Aman et al. |
| 6,212,360 B1 | 4/2001 | Fleming et al. |
| 6,219,095 B1 | 4/2001 | Zhang et al. |
| 6,246,717 B1 | 6/2001 | Chen et al. |
| 6,249,180 B1 | 6/2001 | Maalej et al. |
| 6,266,534 B1 | 7/2001 | Raith et al. |
| 6,272,679 B1 | 8/2001 | Norin |
| 6,275,678 B1 | 8/2001 | Bethscheider et al. |
| 6,297,691 B1 | 10/2001 | Anderson et al. |
| 6,304,594 B1 | 10/2001 | Salinger |
| 6,307,435 B1 | 10/2001 | Nguyen et al. |
| 6,313,885 B1 | 11/2001 | Patel et al. |
| 6,314,441 B1 | 11/2001 | Raghunath |
| 6,320,464 B1 | 11/2001 | Suzuki et al. |
| 6,320,919 B1 | 11/2001 | Khayrallah et al. |
| 6,325,332 B1 | 12/2001 | Cellier et al. |
| 6,330,336 B1 | 12/2001 | Kasama |
| 6,333,924 B1 | 12/2001 | Porcelli et al. |
| 6,335,951 B1 | 1/2002 | Cangiani et al. |
| 6,366,309 B1 | 4/2002 | Siegle |
| 6,369,648 B1 | 4/2002 | Kirkman |
| 6,377,116 B1 | 4/2002 | Mattsson et al. |

| | | |
|---|---|---|
| 6,389,002 B1 | 5/2002 | Schilling |
| 6,411,659 B1 | 6/2002 | Liu et al. |
| 6,411,797 B1 | 6/2002 | Estinto |
| 6,426,822 B1 | 7/2002 | Winter et al. |
| 6,429,740 B1 | 8/2002 | Nguyen et al. |
| 6,433,835 B1 | 8/2002 | Hartson et al. |
| 6,452,977 B1 | 9/2002 | Goldston et al. |
| 6,477,398 B1 | 11/2002 | Mills |
| 6,501,804 B1 | 12/2002 | Rudolph et al. |
| 6,515,713 B1 | 2/2003 | Nam |
| 6,522,683 B1 | 2/2003 | Smee et al. |
| 6,529,715 B1 | 3/2003 | Kitko et al. |
| 6,535,497 B1 | 3/2003 | Raith |
| 6,535,801 B1 | 3/2003 | Geier et al. |
| 6,574,235 B1 | 6/2003 | Arslan et al. |
| 6,597,750 B1 | 7/2003 | Knutson et al. |
| 6,657,978 B1 | 12/2003 | Millman |
| 6,661,761 B2 | 12/2003 | Hayami et al. |
| 6,678,336 B1 | 1/2004 | Katoh et al. |
| 6,700,442 B2 | 3/2004 | Ha |
| 6,718,184 B1 | 4/2004 | Aiken et al. |
| 6,731,622 B1 | 5/2004 | Frank et al. |
| 6,731,700 B1 | 5/2004 | Yakhnich et al. |
| 6,741,662 B1 | 5/2004 | Francos et al. |
| 6,745,050 B1 | 6/2004 | Forsythe et al. |
| 6,772,182 B1 | 8/2004 | McDonald et al. |
| 6,775,521 B1 | 8/2004 | Chen |
| 6,795,496 B1 | 9/2004 | Soma et al. |
| 6,809,587 B2 | 10/2004 | Ghannouchi et al. |
| 6,892,068 B2 | 5/2005 | Karabinis et al. |
| 6,922,436 B1 | 7/2005 | Porat et al. |
| 6,922,439 B2 | 7/2005 | Yamaguchi et al. |
| 6,934,314 B2 | 8/2005 | Harles et al. |
| 6,947,741 B2 | 9/2005 | Beech et al. |
| 6,956,841 B1 | 10/2005 | Stahle et al. |
| 6,956,924 B2 | 10/2005 | Linsky et al. |
| 6,970,496 B1 | 11/2005 | Ben-Bassat et al. |
| 6,980,609 B1 | 12/2005 | Ahn |
| 6,990,627 B2 | 1/2006 | Uesugi et al. |
| 6,999,510 B2 | 2/2006 | Batruni |
| 7,041,406 B2 | 5/2006 | Schuler et al. |
| 7,073,116 B1 | 7/2006 | Settle et al. |
| 7,079,585 B1 | 7/2006 | Settle et al. |
| 7,154,958 B2 | 12/2006 | Dabak et al. |
| 7,161,931 B1 | 1/2007 | Li et al. |
| 7,173,981 B1 | 2/2007 | Chen et al. |
| 7,184,473 B2 | 2/2007 | Chen et al. |
| 7,209,524 B2 | 4/2007 | Chen |
| 7,230,992 B2 | 6/2007 | Walker et al. |
| 7,239,876 B2 | 7/2007 | Johnson et al. |
| 7,251,291 B1 | 7/2007 | Dubuc et al. |
| 7,263,119 B1 | 8/2007 | Hsu et al. |
| 2001/0012322 A1 | 8/2001 | Nagaoka et al. |
| 2001/0016926 A1 | 8/2001 | Riggle |
| 2001/0024479 A1 | 9/2001 | Samarasooriya |
| 2001/0055295 A1 | 12/2001 | Akiyama et al. |
| 2002/0006795 A1 | 1/2002 | Norin et al. |
| 2002/0009141 A1 | 1/2002 | Yamaguchi et al. |
| 2002/0051435 A1 | 5/2002 | Giallorenzi et al. |
| 2002/0071506 A1 | 6/2002 | Lindquist et al. |
| 2002/0082792 A1 | 6/2002 | Bourde et al. |
| 2002/0136327 A1 | 9/2002 | El-Gamal et al. |
| 2002/0154705 A1 | 10/2002 | Walton et al. |
| 2002/0158619 A1 | 10/2002 | Chen |
| 2002/0172296 A1 | 11/2002 | Pilcher |
| 2002/0176516 A1 | 11/2002 | Jeske et al. |
| 2002/0186761 A1 | 12/2002 | Corbaton et al. |
| 2003/0002471 A1 | 1/2003 | Crawford et al. |
| 2003/0043941 A1 | 3/2003 | Johnson et al. |
| 2003/0072385 A1 | 4/2003 | Dragonetti |
| 2003/0138037 A1 | 7/2003 | Kaku et al. |
| 2003/0138040 A1 | 7/2003 | Rouphael et al. |
| 2003/0147472 A1 | 8/2003 | Bach et al. |
| 2003/0171102 A1 | 9/2003 | Yang |
| 2003/0185310 A1 | 10/2003 | Ketchum et al. |
| 2003/0194022 A1 | 10/2003 | Hammons et al. |
| 2004/0013084 A1 | 1/2004 | Thomas et al. |
| 2004/0091059 A1 | 5/2004 | Chen |
| 2004/0110467 A1 | 6/2004 | Wang |
| 2004/0137863 A1 | 7/2004 | Walton et al. |
| 2004/0146014 A1 | 7/2004 | Hammons et al. |
| 2004/0146296 A1 | 7/2004 | Gerszberg et al. |
| 2004/0196935 A1 | 10/2004 | Nieto |
| 2005/0008100 A1 | 1/2005 | Chen |
| 2005/0037724 A1 | 2/2005 | Walley et al. |
| 2006/0018406 A1 | 1/2006 | Chen |
| 2006/0022747 A1 | 2/2006 | Chen et al. |
| 2006/0045191 A1 | 3/2006 | Vasanth et al. |
| 2006/0056541 A1 | 3/2006 | Chen et al. |
| 2007/0011716 A1 | 1/2007 | Koslov et al. |
| 2007/0121718 A1 | 5/2007 | Wang et al. |

FOREIGN PATENT DOCUMENTS

| | | |
|---|---|---|
| EP | 0115218 | 8/1984 |
| EP | 0222076 | 8/1986 |
| EP | 0238822 | 9/1987 |
| EP | 0356096 | 2/1990 |
| EP | 0491668 A2 | 6/1992 |
| EP | 0874474 A2 | 10/1998 |
| EP | 0929164 | 7/1999 |
| EP | 1011245 | 6/2000 |
| EP | 1065854 | 1/2001 |
| EP | 1335512 | 8/2003 |
| FR | 2696295 | 4/1994 |
| FR | 2724522 | 3/1996 |
| JP | 2-5631 | 1/1990 |
| JP | 2-95033 | 4/1990 |
| JP | 03139027 | 6/1991 |
| JP | 5-41683 | 2/1993 |
| JP | 5-114878 | 5/1993 |
| JP | 5-252084 | 9/1993 |
| JP | 07-038615 | 2/1995 |
| JP | 2001-244832 | 9/2001 |
| JP | 2002118611 | 4/2002 |
| KR | 2001 0019997 | 3/2001 |
| WO | WO 99/00957 | 1/1999 |
| WO | WO 99/20001 | 4/1999 |
| WO | WO 99/23718 | 5/1999 |
| WO | 0079753 A1 | 12/2000 |
| WO | 0113532 A1 | 2/2001 |
| WO | WO 01/19013 | 3/2001 |
| WO | WO 01/39455 | 5/2001 |
| WO | WO 01/39456 | 5/2001 |
| WO | WO 02/073817 | 9/2002 |
| WO | WO 2005/074171 | 8/2005 |
| WO | WO 2005/086444 | 9/2005 |

OTHER PUBLICATIONS

Combarel, L. et al.; HD-SAT Modems for the Satellite Broadcasting in the 20 GHz Frequency Band; IEEE Transactions on Consumer Electronics; vol. 41, Issue 4; Nov. 1995; pp. 991-999.

U.S. Appl. No. 10/519,375, filed Dec. 22, 2004, Ernest C. Chen, Non-final Communication dated Dec. 27, 2007.

U.S. Appl. No. 10/913,927, filed Aug. 5, 2004, Ernest C. Chen, Non-final Communication dated Dec. 11, 2007.

U.S. Appl. No. 11/619,173, filed Jan. 2, 2007, Ernest C. Chen, Non-final Communication dated Nov. 15, 2007.

U.S. Appl. No. 10/532,631, filed Apr. 25, 2005, Paul R. Anderson, Non-final Communication dated Nov. 19, 2007.

U.S. Appl. No. 10/691,032, filed Oct. 22, 2003, Weizheng Wang, Non-final Communication dated Nov. 16, 2007.

U.S. Appl. No. 10/519,322, filed Dec. 23, 2004, Ernest C. Chen, Notice of Allowance dated Dec. 11, 2007.

U.S. Appl. No. 10/532,619, filed Apr. 25, 2005, Ernest C. Chen, Notice of Allowance dated Dec. 26, 2007.

U.S. Appl. No. 11/603,776, filed Nov. 22, 2006, Ernest C. Chen, Notice of Allowance dated Jan. 2, 2008.
U.S. Appl. No. 10/692,539, filed Oct. 24, 2003, Ernest C. Chen, Non-final Communication dated May 31, 2007.
U.S. Appl. No. 10/692,539, filed Oct. 24, 2003, Ernest C. Chen, Notice of Allowance dated Sep. 20, 2007.
U.S. Appl. No. 10/532,632, filed Apr. 25, 2005, Ernest C. Chen, Notice of Allowance dated Jan. 7, 2008.
Arslan, Huseyin and Molnar, Karl; "Co-channel Interference Cancellation with Successive Cancellation in Narrowband TDMA Systems"; Wireless Communications and Networking Conference; 2000 IEEE; Sep. 23-28, 2000; Piscataway, New Jersey, USA; vol. 3; pp. 1070-1074; XP010532692; ISBN: 0-7803-6596-8.
Non-final Communicaton dated Mar. 3, 2008 in U.S. Appl. No. 11/656,662 filed Jan. 22, 2007 by Ernest C. Chen et al.
Notice of Allowance dated Mar. 25, 2008 in U.S. Appl. No. 11/653,517 filed Jan. 16, 2007 by Ernest C. Chen.
EPO Communication dated Mar. 11, 2008 in European counterpart Application No. 03777694.5 of corresponding U.S. Appl. No. 10/532,509 filed Oct. 17, 2003 by Ernest Chen et al., now issued as U.S. Appl. No. 7,230,480.
EPO Communication dated Mar. 7, 2008 in European counterpart Application No. 03742393.6 of corresponding U.S. Appl. No. 10/519,375 filed Jul. 3, 2003 by Ernest Chen et al.
Canadian Office Action dated Sep. 12, 2007 in Canadian counterpart Application No. 241259 of corresponding U.S. Appl. No. 10/519,375 filed Jul. 3, 2003 by Ernest C. Chen et al.
Norwegian Office Action dated Nov. 15, 2007 in Norwegian counterpart Application No. 20026115 of corresponding U.S. Appl. No. 09/844,401 filed Apr. 27, 2001 by Ernet C. Chen, now Patent No. 7,209,524.
EPO Communication dated Aug. 3, 2007 in European counterpart application No. 03794510.2 of corresponding U.S. Appl. No. 10/236,414 filed Sep. 6, 2002 by Ernest C. Chen et al.
Non-final Office Communication dated Oct. 16, 2007 in U.S. Appl. No. 10/962,346 filed Oct. 8, 2004 by Ernest Chen.
Non-final Office Communication dated Apr. 1, 2008 in U.S. Appl. No. 10/961,579 filed Oct. 8, 2004 filed by Ernest C. Chen.
Notice of Allowance dated May 6, 2008 in U.S. Appl. No. 10/532,631 filed Apr. 25, 2005 by Paul R. Anderson et al.
Non-final Office Action dated Apr. 30, 2008 in U.S. Appl. No. 10/962,346 filed Oct. 28, 2004 by Ernest Chen.
Notice of Allowance dated Apr. 30, 2008 in U.S. Appl. No. 11/603,776 filed Nov. 22, 2006 by Ernest Chen et al.
EPO Communication dated Apr. 4, 2008 in European counterpart Application No. 03757359.9 corresponding to U.S. Appl. No. 10/165,710 filed Jun. 7, 2002 by Ernest Chen.
Notice of Allowance dated Mar. 12, 2008 in U.S. Appl. No. 11/655,001 filed Jan. 18, 2007 by Weizheng Wang et al.
Japanese Office Action dated Mar. 4, 2008 in Japanese counterpart Application No. 2004-297297 corresponding to U.S. Appl. No. 10/962,346 filed Oct. 8, 2004 by Ernest Chen.
EPO Communication dated Feb. 26, 2008 in European counterpart Application No. 04256234.8 corresponding to U.S. Appl. No. 10/962,346 filed Oct. 8, 2004 by Ernest Chen.
EPO Communication dated Feb. 7, 2008 in European counterpart Application No. 03742400.9 and received from European representative on Feb. 14, 2008 and corresponding to U.S. Appl. No. 10/519,322 filed Dec. 23, 2004 by Ernest Chen et al.
Notice of Allowance dated May 8, 2008 in U.S. Appl. No. 11/619,173 filed Jan. 2, 2007 by Ernest Chen et al.
Notice of Allowance dated May 6, 2008 in U.S. Appl. No. 10/532,632 filed Apr. 25, 2005 by Ernest Chen et al.
Notice of Allowance dated Apr. 21, 2008 in U.S. Appl. No. 10/519,322 filed Dec. 23, 2004 by Ernest Chen et al.
Combarel, L. and Lavan, E.; "HD-SAT (Race 2075): HDTV Broadcasting over KA-Band Satellite, Cable and MMDS"; International Broadcasting Convention; 1994; pp. 633-640; XP006505143.
EPO Communication dated May 6, 2008 in European counterpart Application No. 03774848.0 corresponding to U.S. Appl. No. 10/532,582 filed Apr. 25, 2005 by Ernest C. Chen et al., now issued Feb. 6, 2007 as U.S. Patent No. 7,173,977.
EPO Communication dated May 6, 2008 in European counterpart Application No. 03777627.5 corresponding to U.S. Appl. No. 10/532,619 filed Apr. 25, 2005 by Ernest C. Chen.
Notice of Allowance dated May 22, 2008 in U.S. Appl. No. 10/532,619 filed Apr. 25, 2005 by Ernest C. Chen.
Wolcott, Ted J. et al.; "Uplink-Noise Limited Satellite Channels"; IEEE 1995; pp. 717-721; XP-00580915.
Seskar, Ivan et al.; "Implementation Aspects for Successive Interface Cancellation in DS/CDMA Systems"; Wireless Networks; 1998; pp. 447-452.
Earth Station Technology; 1986; pp. 404-412; XP-002248387.
Palicot, J., Veillard, J.; "Possible Coding and Modulation Approaches to Improve Service Availability for Digital HDTV Satellite Broadcasting as 22 GHz"; IEEE Transactions on Consumer Electronics; vol. 39, Issue 3; Aug. 1993; pp. 660-667.
U.S. Appl. No. 10/693,135, filed Oct. 24, 2003, Chen.
U.S. Appl. No. 10/532,632, filed Apr. 25, 2003, Chen et al.
Chen, Ernest et al.; "DVB-S2 Backward-Compatible Modes: A Bridge Between the Present and the Future"; International Journal of Satellite Communications and Networking; vol. 22, Issue 3, pp. 341-365; published 2004 by John Wiley & Sons, Ltd.
U.S. Appl. No. 10/692,491, filed Oct. 24, 2003, Ernest C. Chen.
U.S. Appl. No. 11/603,776, filed Nov. 22, 2006, Chen et al.
Notice of Allowance dated Jun. 2, 2008 in U.S. Appl. No. 10/691,032 filed Oct. 22, 2003 by Weizheng W. Wang et al.
Notice of Allowance dated Jun. 2, 2008 in U.S. Appl. No. 10/693,135 filed Oct. 24, 2003 by Ernest C. Chen.
Canadian Office Action dated Jan. 22, 2008 in Canadian counterpart Application No. 2487817 corresponding to U.S. Appl. No. 10/165,710 filed Jun 7, 2002 by Ernest C. Chen.
Canadian Office Action dated Jan. 23, 2008 in Canadian counterpart Appl. No. 2484313 corresponding to U.S. Appl. No. 10/962,346 filed Oct. 8, 2004 by Ernest C. Chen.
Canadian Office Action dated Feb. 5, 2008 in Canadian counterpart Appl. No. 2503530 corresponding to U.S. Appl. No. 10/532,632 filed Apr. 25, 2005 by Ernest C. Chen et al.
Canadian Office Action dated Feb. 27, 2008 in Canadian counterpart Appl. No. 2515167 corresponding to U.S. Appl. No. 10/913,927 filed Aug. 5, 2004 by Ernest C. Chen.
Canadian Office Action dated Apr. 22, 2008 in Canadian counterpart Appl. No. 2502924 corresponding to U.S. Appl. No. 10/532,619 filed Apr. 25, 2005 by Ernest C. Chen.
Meyr, Heinrich et al.; "Digital Communication Receivers: Synchronization, Channel Estimation, and Signal Processing"; 1998, John Wiley & Sons, Inc.; pp. 212-213 and 217-218; XP002364874.
Meyr, Heinrich et al.; "Digital Communication Receivers: Synchronization, Channel Estimation, and Signal Processing"; 1998, John Wiley & Sons, Inc.; pp. 610-612; XP002364876.
Fant, T. et al.; "Fourth-Power Law Clock Recovery with Prefiltering"; Proceedings of the International Conference on Communications (ICC); Geneva; May 23-26, 1993; New York; IEEE; US; vol. 3; May 23, 1993; pp. 811-815 XP010137089, ISBN: 0-7803-0950-2; Section I, Introduction.
Chen, Ernest et al.; "DVB-S2 Backward-Compatible Modes: A Bridge Between the Present and the Future"; International Journal of Satellite Communications and Networking; vol. 22, Issue 3, pp. 341-365; published 2004 by John Wiley & Sons, Ltd.
Janssen, G.J.M; Slimane, S.B.: "Performance of a Multiuser Detector for M-PSK Signals Based on Successive Cancellation", ICC 2001, 2001 IEEE International Conference on Communications, Conference Record, Helsinky, Finland, Jun. 11-14, 2001, XP010552960.
Slimane, S.B.; Janssen, G.J.M.: "Power Optimization of M-PSK Cochannel Signals for a Narrowband Multiuser Detector", 2001 IEEE Pacific Rim Conference on Communications, Computer and Signal Processing, Victoria, B.C., Canada, Aug. 26-28, 2001, XP010560334.
Soong, A.C.K.; Krzymien, W.A.: "Performance of a Reference Symbol Assisted Multistage Successive Interference Cancelling Receiver in a Multicell CDMA Wireless System", Conference Record, Communication Theory Mini-Conference GlobeCom '95, IEEE Singapore Nov. 13-17. 1995, XP010159490.
Arslan, H; Molnar, K: "Iterative Co-Channel Interference Cancellation in Narrowband Mobile Radio Systems", Emerging Technologies Symposium: Broadband, Wireless Internet Access, 2000 IEEE Apr. 10-11, 2000, Piscataway, New Jersey, US, XP010538900.

Mazzini, Gianluca: "Power Division Multiple Access", Universal Personal Communications, 1998, ICUPC 1998, IEEE 1998, International Conference on Florence, Italy, Oct. 5-9, 1988, New York, NY, US, IEEE, US Oct. 5, 1998, pp. 543-546, XP010314962 ISBN: 0-7803-5106-1.

Saleh, A.A.M. et al.: "Adaptive Linearization of Power Amplifiers in Digital Radio Systems", Bell System Technical Journal, American Telephone and Telegraph Co., New York, US, vol. 62, No. 4, Part 1, Apr. 1, 1983, pp. 1019-1033, XP002028354.

Ramchandran, Kannan et al.: Multiresolution Broadcast for Digital HDTV Using Joint Source/Channel Coding, IEEE, vol. 11, No. 1, Jan. 1993, pp. 6-22.

Final Rejection dated Jun. 24, 2008 in U.S. Appl. No. 10/519,375 filed Dec. 22, 2004 by Ernest C. Chen et al.

Non-Final Office Action dated Jun. 17, 2008 in U.S. Appl. No. 10/913,927 filed Aug. 5, 2004 by Ernest C. Chen.

European Search Report and Search Opinion dated Jun. 13, 2008 in European counterpart Application No. 07075745.5 corresponding to U.S. Appl. No. 09/844,401 filed Apr. 27, 2001 by Ernest C. Chen, now issued Apr. 24, 2007 as U.S. Patent No. 7,209,524.

El-Gamal, Abbas and Cover, Thomas M.; "Multiple User Information Theory"; Proceedings of IEEE; vol. 68, No. 12; Dec. 1980; pp. 1466-1483; XP007904837.

Scalart, Pascal; Leclerc, Michel; Fortier, Paul; Huynh Huu Tue; "Performance Analysis of a COFDM/FM In-band Digital Audio Broadcasting System"; IEEE Transactions on Broadcasting, IEEE Service Center; Piscataway, New Jersey, USA; vol. 43, No. 2; Jun. 1, 1997; pp. 191-198; XP011006070.

Arslan, Huseyin and Molnar, Karl; "Successive Cancellation of Adjacent Channel Signals in FDMA/TDMA Digital Mobile Radio Systems"; Vehicular Technology Conference; 48th IEEE VTC; Ottawa, Canada; May 18-21, 1998; New York, New York, USA; vol. 3; May 18, 1998; pp. 1720-1724; XP010288123.

Non-final Office Action dated Apr. 30, 2008 in U.S. Appl. No. 10/962,346 filed Oct. 8, 2004 by Ernest C. Chen.

EPO Summons to attend Oral Proceedings dated Jul. 18, 2008 in European counterpart Application No. 02728894.3 corresponding to U.S. Appl. No. 09/844,401 filed Apr. 27, 2001 by Ernest Chen, now issued Apr. 24, 2007 as U.S. Patent No. 7,209,524.

Taiwanese Office Action dated May 14, 2008 in Taiwan counterpart Application No. 092129629 corresponding to U.S. Appl. No. 10/532,631 filed Apr. 25, 2005 by Paul R. Anderson et al.

Canadian Office Action dated Aug. 5, 2008 in Canadian counterpart Application No. 2503532 corresponding to U.S. Appl. No. 10/532,509 filed Oct. 17, 2003 by Ernest C. Chen et al., now issued Jun. 12, 2007 as U.S. Patent No. 7,230,480.

Notice of Allowance dated Aug. 21, 2008 in U.S. Appl. No. 10/532,632 filed Apr. 25, 2005 by Ernest C. Chen et al.

Final Rejection dated Sep. 9, 2008 in U.S. Appl. No. 11/656,662 filed Jan. 22, 2007 by Ernest C. Chen et al.

AMPLITUDE AND PHASE MATCHING FOR LAYERED MODULATION RECEPTION

CROSS-REFERENCE TO RELATED APPLICATIONS

This application is the national phase under 35 U.S.C. §371 of PCT International Application No. PCT/US03/31199 which has an International filing datae of 03 Oct. 2003, which designated the United States of America.

This is a continuation-in-part application and claims the benefit under 35 U.S.C. Section 120 of the following and commonly-assigned U.S. utility patent application, which is incorporated by reference herein:

Utility application Ser. No. 09/844,401, filed Apr. 27, 2001, by Ernest C. Chen, entitled "LAYERED MODULATION FOR DIGITAL SIGNALS,"

This application claims the benefit under 35 U.S.C. §119(e) of the following U.S. Provisional Patent Application, which is incorporated by reference herein:

Application Ser. No. 60/421,332, filed Oct. 25, 2002, by Ernest C. Chen, Jeng-Hong Chen, Kenneth Shum and Joungheon Oh, entitled "AMPLITUDE AND PHASE MATCHING FOR LAYERED MODULATION RECEPTION,"

BACKGROUND OF THE INVENTION

1. Field of the Invention

The present invention relates to systems and methods for receiving layered modulation signals, particularly in a direct satellite broadcast system.

2. Description of the Related Art

Digital signal communication systems have been used in various fields, including digital TV signal transmission, either terrestrial or satellite. As the various digital signal communication systems and services evolve, there is a burgeoning demand for increased data throughput and added services.

It has been proposed that a layered modulation signal, transmitting coherently or non-coherently both upper and lower layer signals, can be employed to meet these needs and more. Such layered modulation systems allow higher information throughput, with and without backward compatibility. When backward compatibility is not required (such as with an entirely new system), layered modulation can still be advantageous because it requires a TWTA peak power significantly lower than that for a conventional 8 PSK or 16 QAM modulation format for a given throughput.

However, to receive such layered modulation signals requires reconstruction of the upper layer signals to remove them from the total signal for lower layer signal processing to occur. Further, the performance of lower layer demodulation depends on the cancellation accuracy. The reconstructed signal should optimally match the received signal in overall amplitude and phase. Therefore, amplitude and phase errors in the reconstructed signal at the point of signal cancellation need to be estimated.

Accordingly, there is a need for systems and methods for amplitude and phase matching of the received signal with the reconstructed signal in a communication system using layered modulation. The present invention meets these needs.

SUMMARY OF THE INVENTION

Layered modulation reconstructs the upper layer signal and removes it from the received signal to leave a lower layer signal. Lower layer signal demodulation performance requires good signal cancellation, which in turn requires the reconstructed signal to include accurate amplitude and phase effects from signal propagation path, filters and low noise block (LNB). Values of these parameters may change from receiver to receiver and therefore must be estimated at each receiver.

Embodiments of the invention utilize a technique to estimate the multiplicative relationship of magnitude and phase components between received and synthesized upper layer signals. These attributes will be multiplied to the signal synthesized from the satellite response, known transmitter and receiver filter characteristics, and estimated narrowband phase noise without additive white Gaussian noise (AWGN). The result of this multiplication is a high-fidelity representation of the upper layer signal which greatly enhances the cancellation performance. In addition, the required computational processing to implement the invention is minimal.

A typical method of the invention includes receiving a layered modulation signal including an upper layer signal and a lower layer signal in noise and interference, demodulating and decoding the upper layer signal from the received signal, estimating an upper layer amplitude factor and an upper layer phase factor from the received layered modulation signal. A substantially ideal upper layer signal is reconstructed from the demodulated and decoded upper layer signal including matching an ideal amplitude and an ideal phase by respectively applying the upper layer amplitude factor and the upper layer phase factor to the reconstructed ideal upper layer signal. Finally, the reconstructed ideal upper layer signal is subtracted from the received signal to produce the lower layer signal for processing.

A typical apparatus of the invention includes a signal processor for demodulating and decoding an upper layer signal from a received layered modulation signal wherein the received signal includes the upper layer signal and a lower layer signal in noise and interference. An estimator provides an estimate of an upper layer amplitude factor and an upper layer phase factor from the received layered modulation signal. A synthesizer reconstructs a substantially ideal upper layer signal from the demodulated and decoded upper layer signal including matching an ideal amplitude and an ideal phase by respectively applying the upper layer amplitude factor and the upper layer phase factor to the reconstructed ideal upper layer signal. Finally, the lower layer signal is produced for processing by subtracting the reconstructed ideal upper layer signal from the received layered modulation signal with a subtractor.

Typically, the received layered modulation signal is a multiple phase shift keyed (PSK) signal in each layer and can comprise separate non-coherent modulated signal layers. Embodiments of the invention can estimate the upper layer phase factor from a mean vector of a distribution of one or more constellation nodes of the upper layer signal from the received layered modulation signal. The upper layer phase and amplitude factors can be estimated from a plurality of constellation nodes of the upper layer signal.

Furthermore, a transmission characteristic map can also be applied to improve the estimates of the upper layer amplitude and phase factors. The transmission characteristic map can comprise AM-AM maps and AM-PM maps characterizing effects of the transmission path. For example, the transmission characteristic map can represent a non-linear distortion map of amplifier characteristics of the transmission path, such as the effect of a travelling wave tube amplifier (TWTA) in a satellite transmission path.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

1. Overview

Figure 1A:
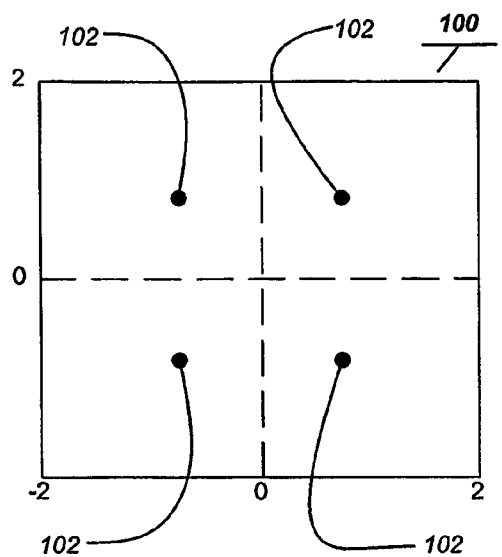
FIGS. 1A-1C illustrate a layered modulation signal constellation for an exemplary QPSK signal format.
Figure 1B:
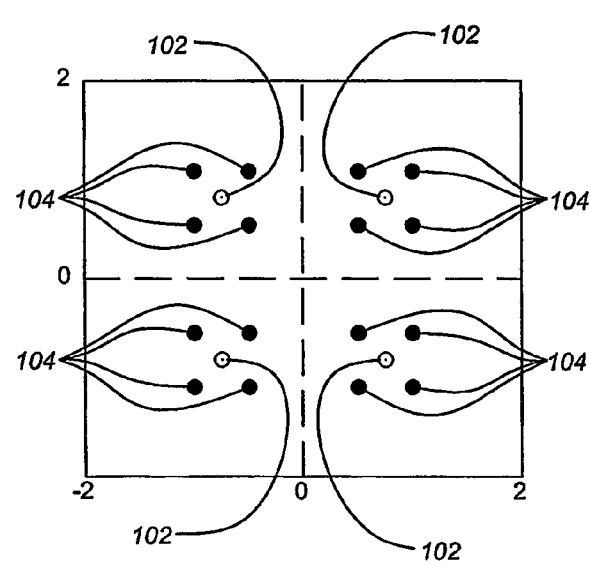
Figure 1C:
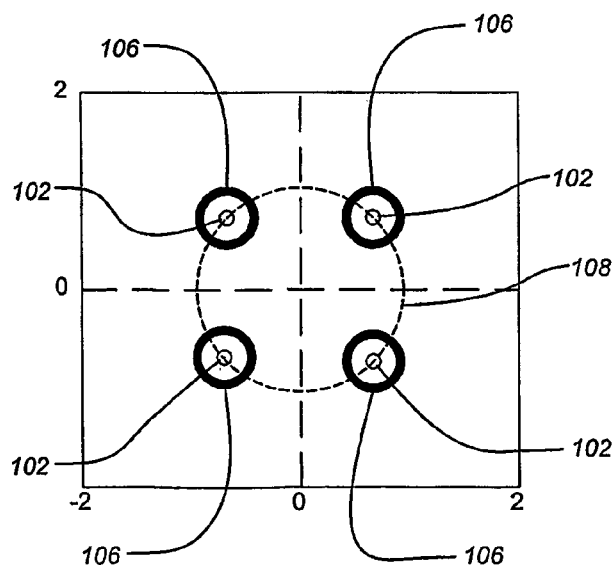

FIGS. 1A-1C illustrate the basic relationship of signal layers in an exemplary layered modulation transmission. FIG. 1A illustrates a first layer signal constellation 100 of a transmission signal showing the signal points or symbols 102. FIG. 1B illustrates the second layer signal constellation of symbols 104 over the first layer signal constellation 100 when the layers are coherent. FIG. 1C illustrates a second signal layer 106 of a second transmission layer over the first layer constellation where the layers are non-coherent. The second layer 106 rotates about the first layer constellation 102 due to the relative modulating frequencies of the two layers in a non-coherent transmission. Both the first and second layers rotate about the origin due to the first layer modulation frequency as described by path 108.

Figure 2B:
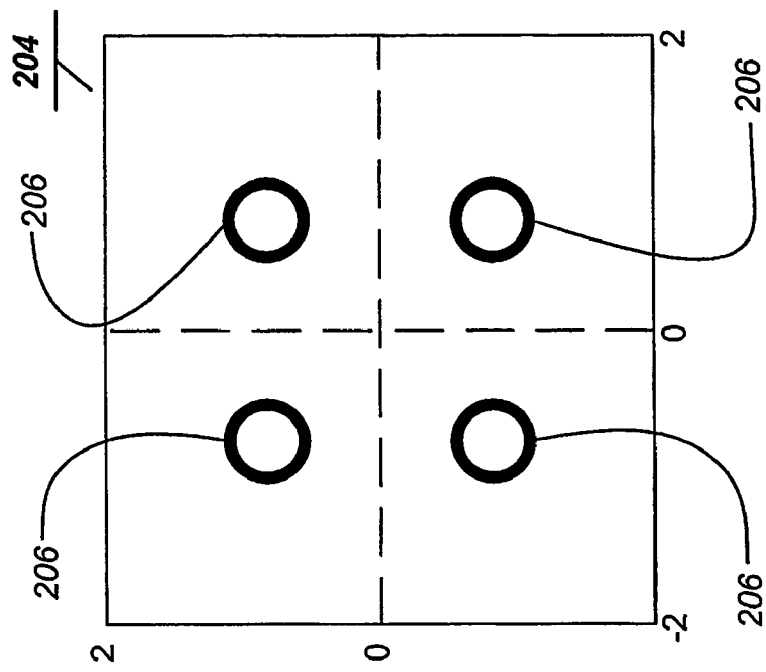
FIGS. 2A and 2B illustrate a signal constellation of a second transmission layer over the first transmission layer before and after first layer demodulation.
Figure 2A:
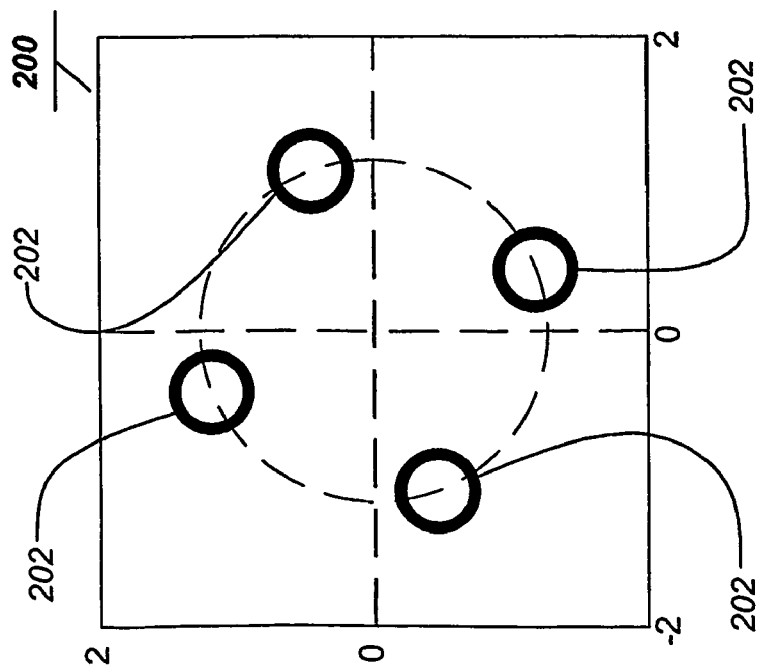

FIGS. 2A-2B illustrate a signal constellation of a second transmission layer over the first transmission layer. FIG. 2A shows the constellation 200 before the first carrier recovery loop (CRL) and FIG. 2B shows the constellation 200 after CRL. In this case, the signal points of the second layer are actually rings 202. Relative modulating frequencies cause the second layer constellation to rotate around the nodes of the first layer constellation. After the second layer CRL this rotation is eliminated The radius of the second layer constellation is determined by its power level. The thickness of the rings 202 is determined by the carrier to noise ratio (CNR) of the second layer. As the two layers are non-coherent, the second layer may be used to transmit analog or digital signals.

Figure 3:
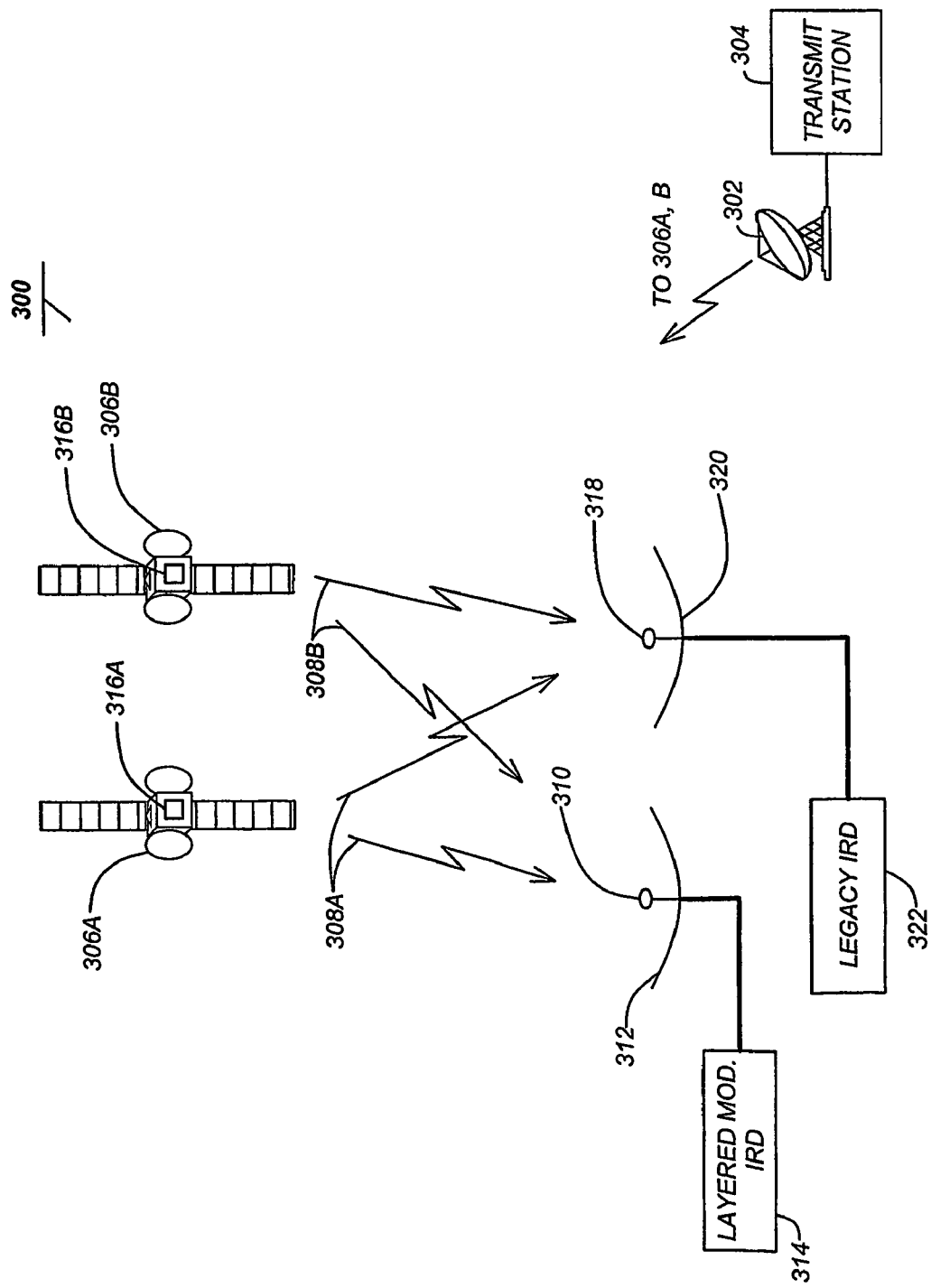
FIG. 3 is a block diagram for a typical system implementation of the present invention.

FIG. 3 is a block diagram for a typical system 300 implementation of the present invention. Separate transmitters 316A, 316B, as may be located on any suitable platforms, such as satellites 306A, 306B, are used to non-coherently transmit different layers of a signal of the present invention. Uplink signals are typically transmitted to each satellite 306A, 306B from one or more transmit stations 304 via an antenna 302. The layered signals 308A, 308B (downlink signals) are received at receiver antennas 312, 320, such as satellite dishes, each with a low noise block (LNB) 310, 318 where they are then coupled to integrated receiver/decoders (IRDs) 314, 322. Because the signal layers may be transmitted non-coherently, separate transmission layers may be added at any time using different satellites 306A, 306B or other suitable platforms, such as ground based or high altitude platforms. Thus, any composite signal, including new additional signal layers will be backwards compatible with legacy receivers which will disregard the new signal layers. Of course, non-backwards compatible applications are also possible in which both IRDs 314 and 322 are layered modulation IRDs, capable of receiving more than one signal layer. To ensure that the signals do not interfere, the combined signal and noise level for the lower layer must be at or below an allowed threshold level for the upper layer.

To receive layered modulation signals the upper layer signals must be reconstructed to cancel them from the total signal for lower layer signal processing to occur. Further, the performance of lower layer demodulation depends on the signal cancellation accuracy. The reconstructed signal should optimally match the received signal in overall amplitude and phase. Therefore, amplitude and phase errors in the reconstructed signal at the point of signal cancellation need to be estimated. The core of this invention includes techniques to optimally estimate a relative amplitude and phase between the received and reconstructed signals.

2. Amplitude and Phase Matching

Figure 4B:
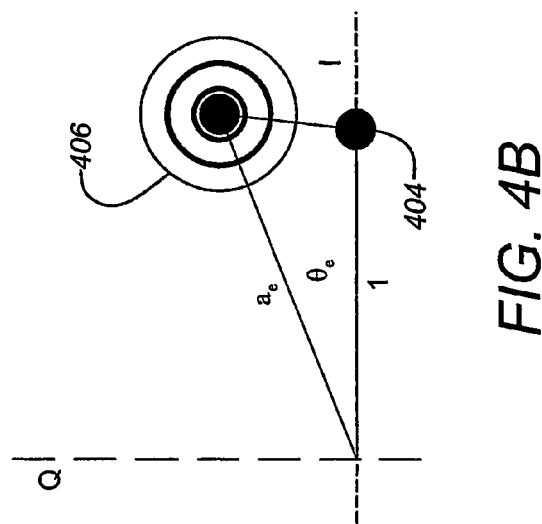
FIGS. 4A and 4B illustrate the problem and the solution, respectively, using QPSK as an example.
Figure 4A:
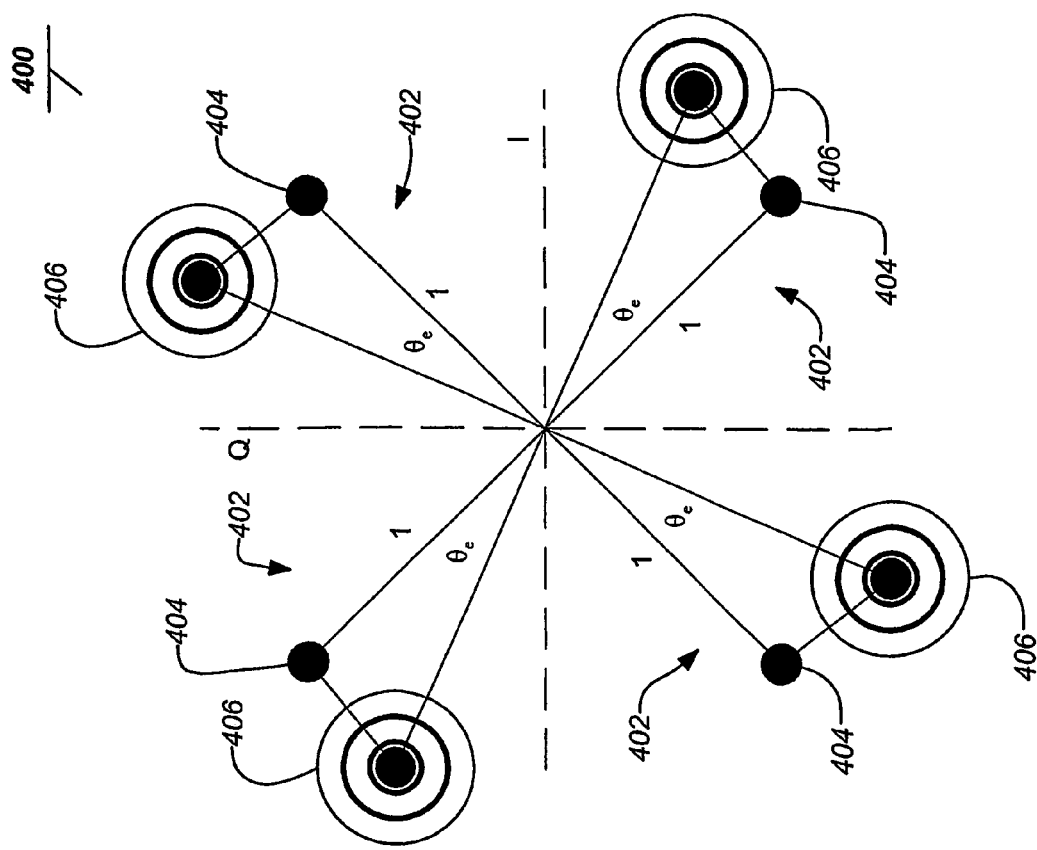

FIG. 4A illustrates the problem which requires amplitude and phase matching, using QPSK as an example. FIG. 4A illustrates the QPSK constellation 400 before constellation amplitude and node phase compensation. All of the four triangles 402 (defining the phase error, $\theta_e$) are identical. Embodiments of the invention can be applied to other modulation formats as well, such as 8PSK and 16QAM. The four nodes 404, represented by circles in FIG. 4A are ideal symbol locations after upper layer demodulation. They have a reference magnitude of one and respective phase angles of $\pi/4$, $3\pi/4$, $5\pi/4$, and $7\pi/4$. However, in real applications before they are converted by the analog to digital (A/D) converter at the receiver, the ideal symbol nodes 404 will have shifted in magnitude and phase with uncompensated and uncalibrated factors as represented by the actual nodes 406. FIG. 4B illustrates the collapsed ideal nodes 404 and the actual nodes 406.

The uncalibrated power represents an unknown magnitude scaling factor to the signal into the receiver (e.g., the set-top box). The low noise block (LNB), filters and other factors prior to the receiver typically introduce a phase distortion factor. These distortions should be included in the reconstructed upper layer signal to improve signal cancellation performance. As described above, FIG. 4A models these unknown distortions. The magnitudes of the received nodes for the upper layer signal are different from the assumed value of one, and are modeled by a relatively constant but unknown scaling factor, $a_e$. The received nodes for the upper layer signal are also offset from the ideal nodes by an equal but unknown phase adjustment amount, the phase error, $\theta_e$. The signal is also corrupted with noise, interference and a second signal, represented by concentric circles around the nodes in FIGS. 4A and 4B. However, knowledge of each symbol node of the QPSK upper layer signal is available from forward error correction (FEC) decoding.

3. Exemplary Receiver Embodiment

Figure 5:
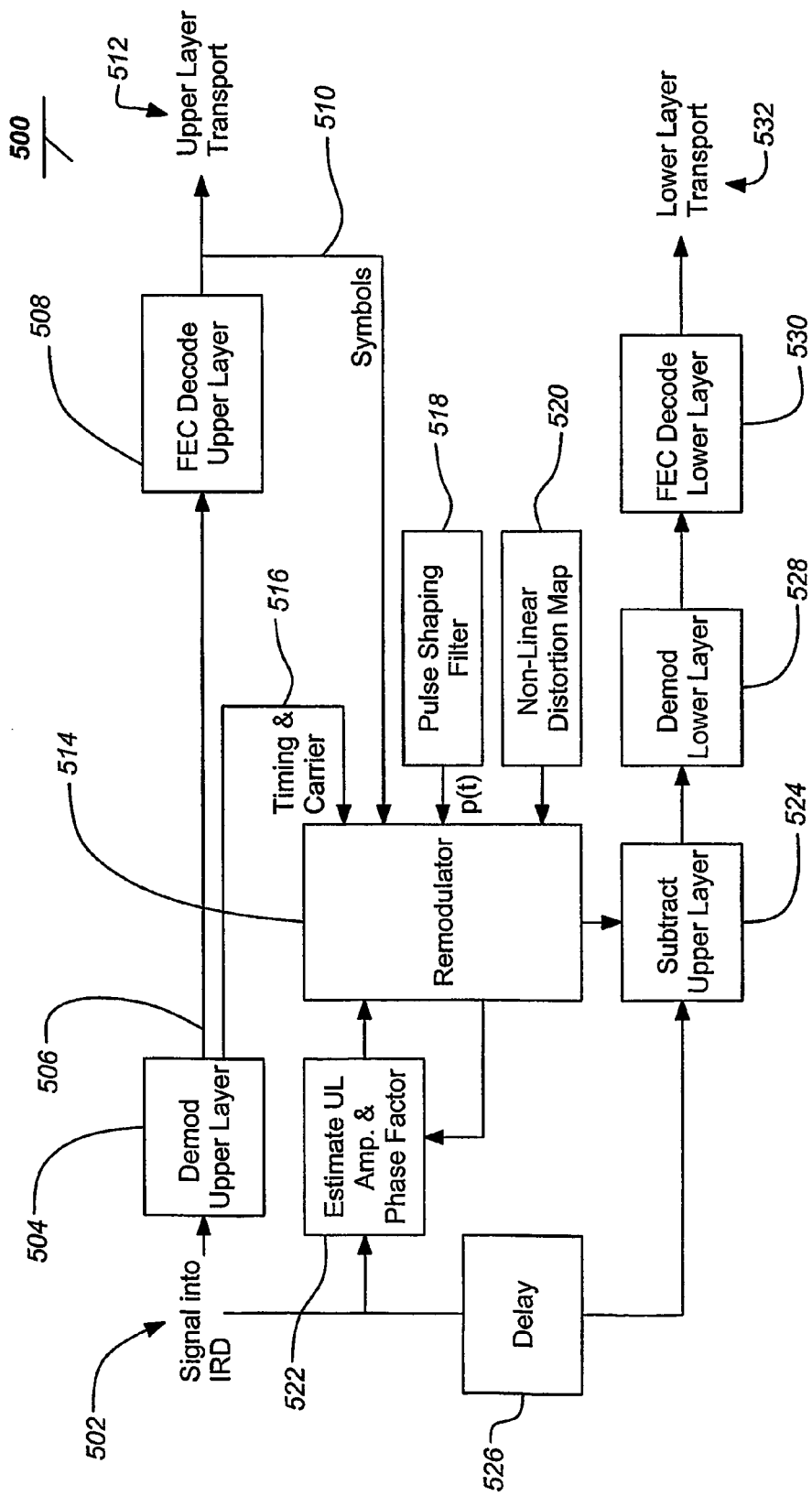
FIG. 5 is an overview of the layered modulation reception process including the legacy receiver processes.

FIG. 5 is a block diagram of the layered modulation reception apparatus. As shown, a receiver or integrated receiver/decoder (IRD) 500 embodiment of the invention estimates the upper layer power and phase which is used to re-scale the re-modulated signal, before the signal is subtracted from the received signal to leave only the lower layer signal. The signal 502 is received and the upper layer is demodulated by the demodulator 504. The demodulated signal 506 is then decoded (e.g., forward error correction decoding) by the decoder 508 to produce symbols 510 which are then communicated to the upper layer transport 512 for further processing and presentation to a viewer. The demodulator 504 and decoder 508 can be referred to in combination as a signal processor for processing the received signal. The foregoing processes encompass the functions of a legacy receiver decoding only the upper layer of the incoming signal 502 in cases of backwards compatible applications.

The lower layer of the incoming signal 502 requires further processing to decode. An ideal upper layer signal is generated by a synthesizer or remodulator 514. The remodulator 514 receives the upper layer timing and carrier 516 from the upper layer demodulator 504 and the upper layer symbols 510 output from the decoder 508. To enhance production of the ideal upper layer signal, the remodulator 514 can also receive input from a pulse shaping filter 518 and a non-linear distortion map 520 (which models transmission characteristics applied to the signal by elements such as the travelling wave tube amplifiers [TWTA] of the satellite).

A key element of the present invention comprises an estimator 522 which receives the incoming signal 502 and estimates an upper layer amplitude and phase factor. The factor is supplied to the remodulator 514 to further improve accurate reproduction of the ideal upper layer signal and benefit recovery of the lower layer.

The ideal upper layer signal is communicated to a subtractor 524 where it is subtracted from the incoming signal 502 which has been appropriately delayed by a delay function 526 to account for the processing time of the upper layer demodulator 504 and the remodulator 514. The output of the subtractor 524 is the lower layer signal which is communicated to the lower layer demodulator 528 and decoder 530 to produce the lower layer symbol output 532 which is ready to be processed by the lower layer transport for presentation.

4. Amplitude and Phase Matching for Constant-Envelope Signals

Figure 6:
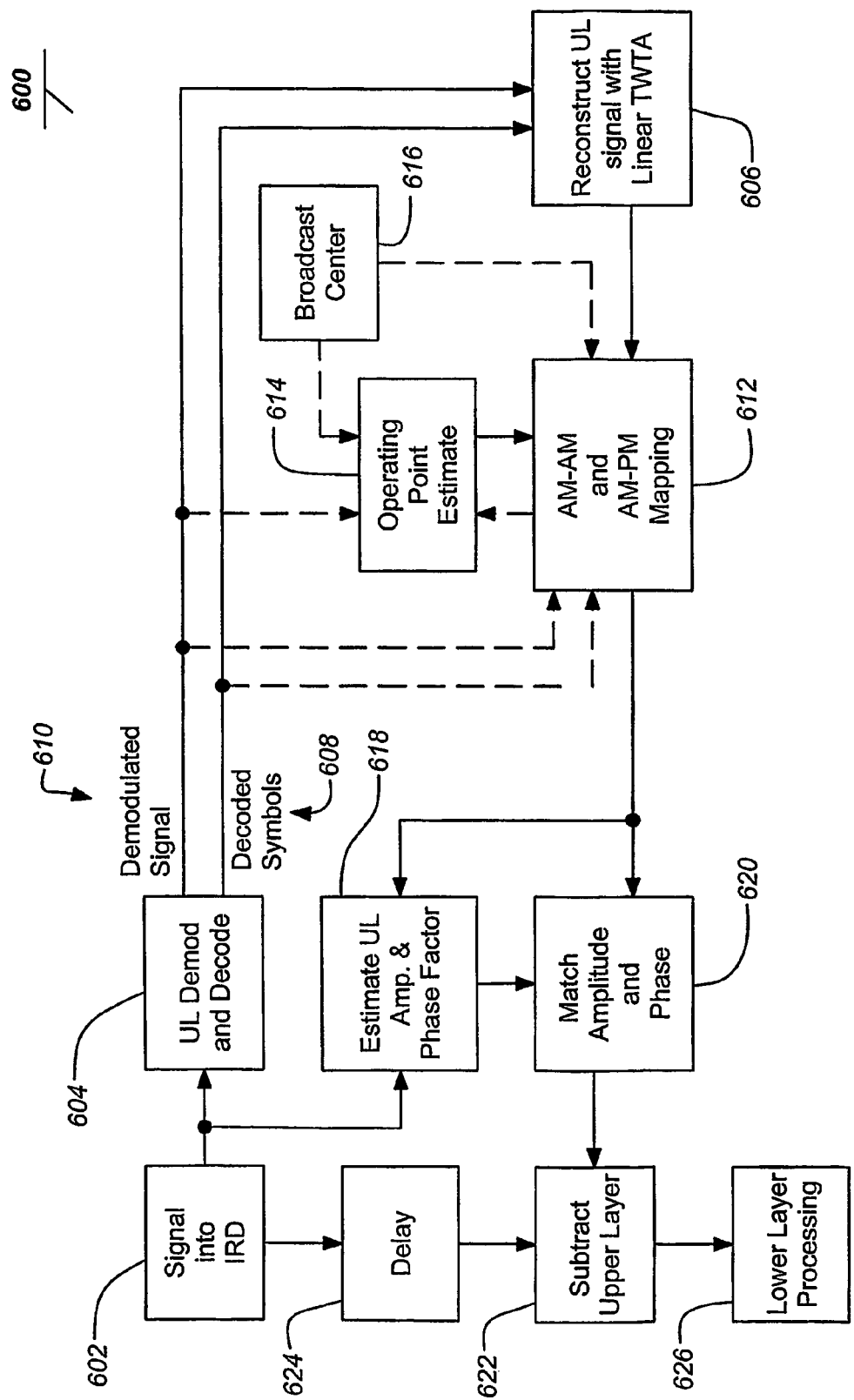
FIG. 6 is a flowchart of the signal cancellation process.

FIG. 6 is a flowchart of the signal cancellation process 600. As the received signal enters into the IRD 502 at block 602, the upper layer signal is first demodulated and decoded as described above at block 604. Meanwhile, an ideal upper layer signal is synthesized at block 606 with the decoded symbols 608 and other waveform parameters 610 derived from block 602. The synthesized signal is then mapped with TWTA AM-AM and AM-PM curves at block 612, which are positioned with a suitable operating point estimate 614 obtained from the local upper layer demodulator 604 or downloaded from broadcast center, shown at block 616.

Typically, the TWTA performance maps will comprise measurements of the output amplitude modulation versus the input amplitude modulation (the AM-AM map) and the output phase modulation versus the input amplitude modulation (the AM-PM map). In the present invention, the received signal represents the amplifier output (plus lower layer signal, interference and noise) and the generated ideal signal represents the amplifier input. The maps are used to determine the effect of the TWTA on the signal and simulate those effects in the layer subtraction to yield a more precise lower layer signal. These performance maps are used to facilitate and/or improve reception of different layers of a system using a layered modulation transmission scheme.

Estimation of the operating point and AM-AM and AM-PM mapping are further discussed in U.S. patent application Ser. No. 10/165,710 filed Jun. 7, 2002, by Ernest C. Chen and entitled "SATELLITE TWTA ON-LINE NON-LINEARITY MEASUREMENT", and Utility application Ser. No. 09/844,401, filed Apr. 27, 2001, by Ernest C. Chen, entitled "LAYERED MODULATION FOR DIGITAL SIGNALS," which are both incorporated by reference herein.

The TWTA-mapped signal and the received signal are used to estimate the overall amplitude and phase factors in block 618. The mapped TWTA signal is then matched to the received signal in amplitude and phase at block 620. Finally, the corrected signal is subtracted at block 622 from the received signal, which has been properly delayed for timing alignment at block 624, to reveal the lower layer signal at block 626.

The key process of the present invention lies in referencing the received signal to the reconstructed signal, as in blocks 618 and 620. Referring back to FIG. 4A, a ratio is formed between the received signal and its decoded node signal. FIG. 4B shows the distribution of these complex ratios in effective additive noise; division by the decoded node signal collapses the received signals from all QPSK nodes to a single node near the horizontal axis. The mean of this distribution is the center of the concentric circles that represent the noise distribution. The mean vector is the estimate for signal matching purposes. The estimate vector consists of an amplitude, $a_e$, and phase, $\theta_e$. The mathematical derivation is shown as follows.

$r_i$ is the received signal for the i-th upper layer symbol in an effective noise;

$n_i$ is the effective noise associated with $r_i$;

$\theta_{(i)}$ is the decoded phase for the i-th symbol;

$N_s$ is the number of signal symbols processed;

$a_e$ is the amplitude scale error to be estimated;

$\theta_e$ is the angular error to be estimated; and $$\theta_{(i)} \in \left\{\frac{\pi}{4}, \frac{3\pi}{4}, \frac{5\pi}{4}, \frac{7\pi}{4}\right\}$$

for QPSK. Other modulation forms may be processed with a generalized solution discussed in the next section.

The received signal after carrier recovery can be modeled as:

$$r_i = a_e \exp(j(\theta_{(i)} + \theta_e)) + n_i, \text{ where } i=1, \ldots, N_s \quad (1)$$

Removing the decoded symbol phase yields:

$$r_i' \equiv \frac{r_i}{\exp(j\theta_{(i)})} = a_e \exp(j\theta_e) + n_i'; \quad (2)$$

where $$n_i' = \frac{n_i}{\exp(j\theta_{(i)})}.$$

$n_i$ and $n'_i$ have zero mean and the same variance. The estimated complex amplitude and phase scale factor is formed by averaging over $r'_i$ as follows.

$$r_0 \equiv \text{avg}\{r'_i\} = \frac{\sum_{i=1}^{N_s} r'_i}{N_s} \equiv \hat{a}\exp(j\hat{\theta}_e). \tag{3}$$

The amplitude and phase error estimates are:

$$\hat{a}_e = \text{abs}(r_0); \text{ and} \tag{4}$$

$$\hat{\theta}_e = \text{angle}(r_0). \tag{5}$$

The preceding analysis shows that the estimated residual phase $\hat{\theta}_e$ will be zero if the signal phase has been precisely followed with carrier recovery loop, etc. $\hat{\theta}_e$ "sweeps up" residual phase errors due to carrier recovery inaccuracy and other errors.

As shown by amplitude and phase matching 620 operation in FIG. 6, the estimated amplitude and phase factors form a complex multiplier to the reconstructed signal for subtraction from the delayered received signal to optimally reveal the lower layer signal.

5. Amplitude and Phase Matching for General Signals

Figure 7B:
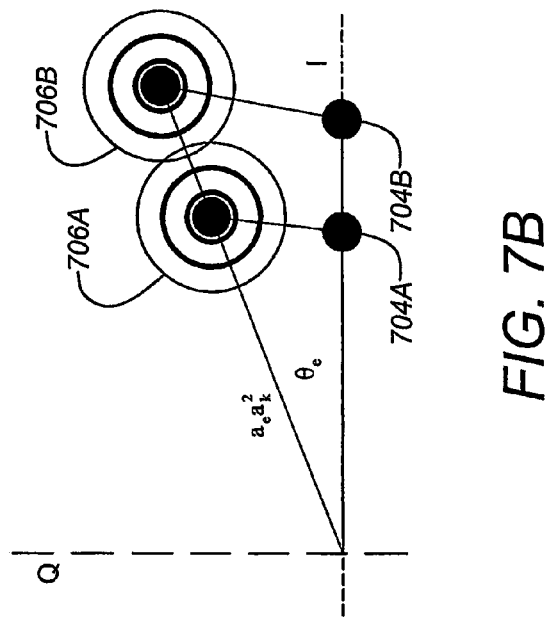
FIGS. 7A and 7B illustrate a general solution for amplitude and phase matching between received and reconstructed signals.
Figure 7A:
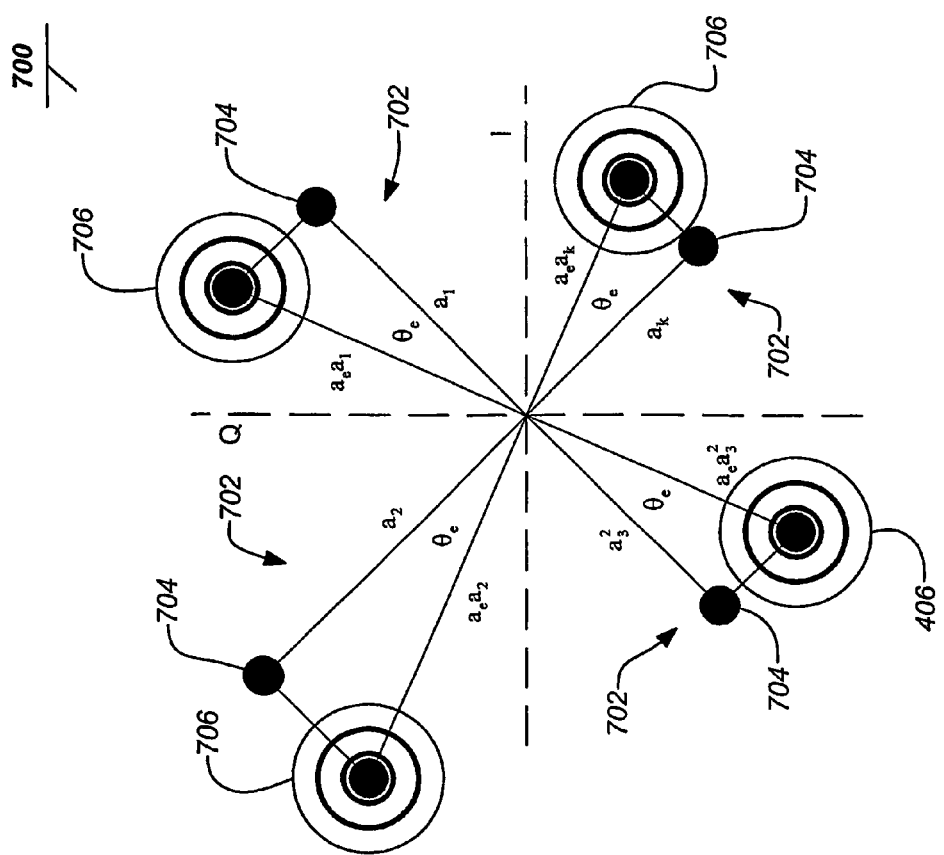

FIGS. 7A and 7B illustrate a general solution for amplitude and phase matching between received and reconstructed signals that are not restricted to QPSK. As shown in FIG. 7A, all triangles 702 are similar with ratios $a_1, a_2, \ldots a_k$, etc. Thus, the technique, described above with respect to QPSK, can be easily extended for use with a reconstructed signal which varies in amplitude due to unequal signal node amplitudes, variations due to inter-symbol interference prior to matched filtering, satellite non-linear response, etc. The reconstructed signals are shown collapsed in FIG. 7B after node phase compensation with unequal amplitudes between ideal nodes 704A and 704B as well as their respective received nodes 706A and 706B.

A general analysis for amplitude and phase matching of the present invention follows. This analysis degenerates to the preceding analysis when applied to a QPSK constellation which has identical magnitudes (amplitudes). For a general layered communication signal, the constellation symbols may utilize different amplitudes and phases. Thus, $a_{(i)}$ is the amplitude of the i-th symbol over time;

$\theta_{(i)}$ is the phase of the i-th symbol over time; and $s_{(i)} = a_{(i)} \exp(j\theta_{(i)})$.

The received signal after the carrier recovery loop can be modeled as:

$$r_i = a_e a_{(i)} \exp(j(\theta_{(i)} + \theta_e)) + n_i, \text{ where } i=1, \ldots, N_s. \tag{6}$$

Removing the remodulated and re-encoded signal phase and weighting by the signal magnitude, similar to matched-filtering forms:

$$r'_i = \frac{a_{(i)} r_i}{\exp(j\theta_{(i)})} = a_e a_{(i)}^2 \exp(j\theta_e) + n'_i \tag{7}$$

where $n'_i = \frac{a_{(i)} n_i}{\exp(j\theta_{(i)})}$ and $n_i$ and $n'_i$ have zero mean. The estimated complex amplitude and phase scale factor is formed by summing over $r'_i$, normalized by the sum of the ideal powers as follows.

$$r_0 \equiv \frac{\sum_{i=1}^{N_s} r'_i}{\sum_{i=1}^{N_s} a_i^2} \equiv \hat{a}_e \exp(j\hat{\theta}_e). \tag{8}$$

As before, the amplitude and phase error estimates are:

$$\hat{a}_e = abs(r_0); \text{ and} \tag{9}$$

$$\hat{\theta}_e = \text{angle}(r_0). \tag{10}$$

Note that equation (8) reduces to equation (3) when all $a_{(i)}$ are equal. However, the general solution of equation (8) may be preferred even for nPSK signals since all received signal symbols have non-constant amplitudes prior to receiver matched filtering.

6. Alternative General Analysis for Amplitude and Phase Matching

An alternative approach to the problem, which results in the same solution as the preceding general solution can be found through vector analysis. The approach begins with the same mathematical model, but uses complex numbers to represent phases and magnitudes of the received symbols.

The problem is characterized in terms of a minimization process. Suppose R is the received signal vector and X is the reconstructed signal vector; the vectors consist of the associated time samples as their components. Both are column vectors with length $N_s$, where $N_s$ is the number of data symbols to be processed. A complex scalar factor z is to be estimated for multiplication to X later. The estimate is chosen to minimize the difference between R and zX, or specifically, the norm-squared error: $(R-zX)^H(R-zX)$, where $(\ )^H$ is the Hermitian operator. The result is a least-square-error (LSE) solution:

$$z_{LS} = \frac{X^H R}{X^H X} \tag{11}$$

$X^H X$ is a scalar equal to the power of the reconstructed signal. $z_{LS}$ is the complex correlation between received signal vector X and reconstructed signal vector R, normalized by $X^H X$. Thus, $z_{LS}$ is the complex correlation of the received signal vector and the reconstructed signal vector and normalized by a power of the reconstructed signal vector, identical to the previous solution expressed by equation (8).

This concludes the description including the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching.

It is intended that the scope of the invention be limited not by this detailed description, but rather by the claims appended hereto. The above specification, examples and data provide a complete description of the manufacture and use of the apparatus and method of the invention. Since many embodiments of the invention can be made without departing from the scope of the invention, the invention resides in the claims hereinafter appended.

What is claimed is:

1. A method of receiving layered modulation signals, comprising:
   receiving a layered modulation signal including an upper layer signal and a lower layer signal;
   demodulating and decoding the upper layer signal from the received layered modulation signal;
   estimating an upper layer amplitude factor and an upper layer phase factor from the received layered modulation signal;
   reconstructing a substantially ideal upper layer signal from the demodulated and decoded upper layer signal including matching an ideal amplitude and an ideal phase by applying the upper layer amplitude factor and the upper layer phase factor to the reconstructed ideal upper layer signal;
   subtracting the reconstructed ideal upper layer signal from the received layered modulation signal to produce the lower layer signal for processing.

2. The method of claim 1, wherein the layered modulation signal comprises separate non-coherent modulated signal layers.

3. The method of claim 1, wherein the layered modulation signal comprises a layered multiple phase shift keyed (PSK) signal.

4. The method of claim 1, wherein the upper layer phase factor and the upper layer amplitude factor are combined to form a complex multiplying factor, which is the complex correlation of a received signal vector and a reconstructed signal vector and normalized by a power of the reconstructed signal vector.

5. The method of claim 4, wherein the complex multiplying factor is mathematically expressed by $z_{LS}=(X^H X)^{-1} X^H R$, where R is the received signal vector and X is the reconstructed signal vector.

6. The method of claim 1, wherein the upper layer phase factor is estimated from a mean vector of a distribution of the received layered modulation signal relative to one or more nodes of the upper layer signal.

7. The method of claim 1, wherein the upper layer phase factor is estimated for a plurality of nodes of the upper layer signal in combination.

8. The method of claim 1, wherein the upper layer amplitude factor is estimated from a mean vector of a distribution of the received layered modulation signal relative to one or more nodes of the upper layer signal.

9. The method of claim 1, wherein the upper layer amplitude factor is estimated for a plurality of nodes of the upper layer signal in combination.

10. The method of claim 1, wherein the upper layer amplitude factor is estimated separately for one or more of a plurality of nodes of the upper layer signal.

11. The method of claim 1, wherein the upper layer amplitude factor and the upper layer phase factor are further estimated from a transmission characteristic map.

12. The method of claim 11, wherein the transmission characteristic map represents a non-linear distortion map of an amplifier characteristic of the transmission path.

13. The method of claim 11, wherein the transmission characteristic map comprises an AM-AM map.

14. The method of claim 11, wherein the transmission characteristic map comprises an AM-PM map.

15. An apparatus for receiving layered modulation signals, comprising:
   a signal processor for demodulating and decoding an upper layer signal from a received layered modulation signal wherein the received signal includes the upper layer signal and a lower layer signal;
   an estimator for estimating an upper layer amplitude factor and an upper layer phase factor from the received layered modulation signal;
   a synthesizer for reconstructing a substantially ideal upper layer signal from the demodulated and decoded upper layer signal including matching an ideal amplitude and an ideal phase by applying the upper layer amplitude factor and the upper layer phase factor to the reconstructed ideal upper layer signal; and
   a subtractor for subtracting the reconstructed ideal upper layer signal from the received layered modulation signal to produce the lower layer signal for processing.

16. The apparatus of claim 15, wherein the layered modulation signal comprises separate non-coherent modulated signal layers.

17. The apparatus of claim 15, wherein the layered modulation signal comprises a layered multiple phase shift keyed (PSK) signal.

18. The apparatus of claim 15, wherein the upper layer phase factor and the upper layer amplitude factor are combined in a complex multiplying factor, which is the complex correlation of a received signal vector and a reconstructed signal vector and normalized by a power of the reconstructed signal vector.

19. The apparatus of claim 18, wherein the complex multiplying factor is mathematically expressed by $z_{LS}=(X^H X)^{-} X^H R$, where R is a received signal vector and X is a reconstructed signal vector.

20. The apparatus of claim 15, wherein the upper layer phase factor is estimated from a mean vector of a distribution of the received layered modulation signal relative to one or more nodes of the upper layer signal.

21. The apparatus of claim 15, wherein the upper layer phase factor is estimated for a plurality of nodes of the upper layer signal in combination.

22. The apparatus of claim 15, wherein the upper layer amplitude factor is estimated from a mean vector of a distribution of the received layered modulation signal relative to one or more nodes of the upper layer signal.

23. The apparatus of claim 15, wherein the upper layer amplitude factor is estimated for a plurality of nodes of the upper layer signal in combination.

24. The apparatus of claim 15, wherein the upper layer amplitude factor is estimated separately for one or more of a plurality of nodes of the upper layer signal.

25. The apparatus of claim 15, wherein the upper layer amplitude factor and the upper layer phase factor are further estimated from a transmission characteristic map.

26. The apparatus of claim 25, wherein the transmission characteristic map represents a non-linear distortion map of an amplifier characteristic of the transmission path.

27. The apparatus of claim 25, wherein the transmission characteristic map comprises an AM-AM map.

28. The apparatus of claim 25, wherein the transmission characteristic map comprises an AM-PM map.

* * * * *